United States Patent
Tomkins

(10) Patent No.: US 9,279,927 B2
(45) Date of Patent: Mar. 8, 2016

(54) SECURITY DEVICE HAVING OPTICALLY VARIABLE DEVICE PORTION AND METHOD OF MAKING THE SAME

(71) Applicant: OPSEC SECURITY GROUP, INC., Denver, CO (US)

(72) Inventor: Donald William Tomkins, Lancaster, PA (US)

(73) Assignee: OPSEC SECURITY GROUP, INC., Denver, CO (US)

( * ) Notice: Subject to any disclaimer, the term of this patent is extended or adjusted under 35 U.S.C. 154(b) by 331 days.

(21) Appl. No.: 13/767,985

(22) Filed: Feb. 15, 2013

(65) Prior Publication Data

US 2014/0232974 A1 Aug. 21, 2014

(51) Int. Cl.
| | | |
|---|---|---|
| C09K 19/02 | (2006.01) | |
| G02B 5/30 | (2006.01) | |
| B42D 25/364 | (2014.01) | |
| B42D 25/324 | (2014.01) | |
| B42D 25/328 | (2014.01) | |

(52) U.S. Cl.
CPC ............ G02B 5/3016 (2013.01); B42D 25/324 (2014.10); B42D 25/328 (2014.10); B42D 25/364 (2014.10)

(58) Field of Classification Search
None
See application file for complete search history.

(56) References Cited

U.S. PATENT DOCUMENTS

| | | |
|---|---|---|
| 5,678,863 A | 10/1997 | Knight et al. |
| 6,061,122 A | 5/2000 | Hoshino et al. |
| 6,301,047 B1 | 10/2001 | Hoshino et al. |
| 6,628,439 B2 | 9/2003 | Shiozawa et al. |
| 6,740,431 B2 | 5/2004 | Hoshino et al. |
| 7,201,821 B2 | 4/2007 | Hoshino et al. |
| 7,388,627 B2 | 6/2008 | Hoshino et al. |
| 7,391,546 B2 | 6/2008 | Hoshino et al. |
| 7,943,392 B2 | 5/2011 | Hoshino et al. |
| 2004/0070803 A1* | 4/2004 | Decker et al. .................... 359/15 |
| 2010/0196587 A1* | 8/2010 | Keller ............................... 427/7 |

OTHER PUBLICATIONS

Van Renesse, R. L., Optical Document Security (Artech House Press, 1984), pp. 263-280.

* cited by examiner

*Primary Examiner* — Richard Kim
(74) *Attorney, Agent, or Firm* — Eckert Seamans Cherin & Mellott, LLC; Nathaniel C. Wilks

(57) ABSTRACT

A security device includes a liquid crystal layer having one of a cholesteric phase, a nematic phase, and a cholesteric phase and having molecules therein aligned volumetrically in a predetermined manner to form a predetermined diffractive optical pattern or image. The molecules of the liquid crystal layer are volumetrically aligned in the predetermined manner through at least a portion of the thickness of the liquid crystal layer.

8 Claims, 10 Drawing Sheets

SECURITY DEVICE HAVING OPTICALLY VARIABLE DEVICE PORTION AND METHOD OF MAKING THE SAME

BACKGROUND

1. Field

The disclosed concept relates generally to security devices having an optically variable device (OVD) portion and, more particularly, to security devices having OVDs that exhibit both Lippmann-Bragg-type optical color change as well as diffractive optical effects. The disclosed concept also relates to methods for creating such security devices.

2. Description of Related Art

An optically variable device (OVD) is a visual device that creates a change or shift in appearance, such as, for example and without limitation, a change in color, when observed from different relative observation points. The evolution of the OVD as a security device stems largely from the search for a mechanism to resist counterfeiting of certain articles and products, or alternatively to render such copying obvious. For example, and without limitation, paper money, banknotes, certificates, security labels, product hang tags, drivers' licenses, ID cards, and credit cards, among other things, frequently employ one or more OVDs to resist counterfeiting or to verify authenticity.

A counterfeiting deterrent employed in some OVDs involves the use of one or more diffractive images that exhibit optical effects which cannot be reproduced using traditional printing and/or photocopying processes. Such images may be, for example, volume holograms or diffractive grating structures (also known as surface relief holograms). When an OVD including such an image is viewed from a predetermined location and tilted so that it is viewed from a different relative location, an optical effect results, such as, for example and without limitation, movement of the image or a change in color. However, additional unique effects are continually needed to stay ahead of the counterfeiters' ability to access or simulate new imaging technologies. Accordingly, other security mechanisms having image-related optical effects have evolved over time.

One such optical effect is color-shifting created by constructing the OVD with a layer or partial layer of a liquid crystal material. The use of films of color-changing liquid crystal materials in OVDs is known in the art. Such films are typically produced by coating liquid crystal material onto a substrate, aligning the molecular structure so that the molecular structure takes on the form of a highly ordered planar Lippmann-Bragg structure, and finally cross-linking the liquid crystal to preserve the aligned planar molecular structure. The Lippmann-Bragg structure has the optical property of reflecting a narrow band of wavelengths of light by the process of refraction from the body of the aligned liquid crystal. Importantly, as the plane of the liquid crystal is tilted relative to the illuminating and viewing angle, the wavelength of the selective band of reflected light shifts to a different color, the magnitude of the shift being dependent on the degree of tilt. This effect is difficult to simulate and can form the basis of a useful security device.

The combination of liquid crystal layers exhibiting a color-changing effect as well as surface relief structures or holograms exhibiting a diffractive optical effect offers an even greater level of security. An OVD exhibiting this combination of effects may be realized either by laminating a liquid crystal film to an embossed surface relief hologram film, or by embossing a surface relief diffractive or holographic structure into one surface of an aligned liquid crystal film. For example, U.S. Pat. No. 6,628,439 to Shiozawa describes authentication films formed by both of these methods. Films exhibiting both color-changing and diffractive effects may be usefully employed in security devices to protect documents or articles of value. The security provided by the diffractive or holographic image is supplemented by the color-changing background effect provided by the liquid crystal layer. However, as such a device essentially comprises two separate optical structures (e.g., the surface relief and the aligned liquid crystal), the security of the device can be compromised if the structures are separated, copied or altered separately and then re-joined together.

There is still a need, therefore, for an OVD that combines the color-shifting and diffractive optical effects, but is not easily separable into two component parts which allow the two optical effects to be copied or altered separately.

SUMMARY OF THE INVENTION

These needs and others are met by embodiments of the disclosed concept which provide a security device having a liquid crystal layer having one of a smectic phase, a nematic phase, and a cholesteric phase and having molecules therein aligned volumetrically through at least a portion of the thickness of the liquid crystal layer in a predetermined manner to form a predetermined diffractive optical pattern or image. These needs and others are also met by embodiments of the disclosed concept which provide a method of creating a security device having a liquid crystal layer having one of a smectic phase, a nematic phase, and a cholesteric phase and having molecules aligned volumetrically, through at least a portion of the thickness of the liquid crystal layer in a predetermined manner to form a predetermined diffractive optical pattern or image. The disclosed concept also relates to articles that employ such security devices.

In accordance with aspects of the disclosed concept a security device comprises: a liquid crystal layer having one of a smectic phase, a nematic phase, and a cholesteric phase and having molecules therein aligned volumetrically in a predetermined manner to form a predetermined diffractive optical pattern or image, wherein the molecules of the liquid crystal layer are volumetrically aligned in the predetermined manner through at least a portion of the thickness of the liquid crystal layer.

The liquid crystal layer may have a cholesteric phase.

The security device may include a substrate layer disposed on the liquid crystal layer.

The substrate layer may be disposed directly on the liquid crystal layer and comprise a material that causes spontaneous alignment of the liquid crystal layer.

The security device may include a primer layer disposed directly on the liquid crystal layer and between the liquid crystal layer and the substrate layer, wherein the primer layer comprises a material that causes spontaneous alignment of the liquid crystal layer.

The security device may include an adhesive layer configured to attach the optically variable device to an article.

The security device may include an opaque layer disposed between the liquid crystal layer and the adhesive layer.

The molecules of the liquid crystal layer may be volumetrically aligned in the predetermined manner through the full thickness of the liquid crystal layer.

In accordance with other aspects of the disclosed concept a method of creating a security device comprises: providing a substrate having a surface relief diffractive structure in a surface thereof, the substrate including a material that causes spontaneous alignment of liquid crystal; applying a liquid crystal layer to the diffractive structure, the liquid crystal layer being configured to align to have one of a smectic phase, a nematic phase, and a cholesteric phase; allowing time for molecules of the liquid crystal layer to align to have the one of the smectic phase, the nematic phase, or cholesteric phase and to volumetrically align through at least a portion of the thickness of the liquid crystal layer to conform to the diffractive structure; and cross-linking the liquid crystal layer.

The liquid crystal layer may be configured to have a cholesteric phase.

The method may include removing the substrate; and polishing the diffractive relief surface of the liquid crystal layer to be smooth.

The method may include disposing the liquid crystal layer on a second substrate.

The method may include applying an adhesive layer to the liquid crystal layer.

The method may include applying an opaque layer to the liquid crystal layer; and applying an adhesive layer to the opaque layer.

Allowing time for molecules of the liquid crystal layer to volumetrically align through at least half of the thickness of the liquid crystal layer to conform to the diffractive structure may comprise allowing time for the molecules to volumetrically align through the whole thickness of the liquid crystal layer to conform to the diffractive structure.

In accordance with other aspects of the disclosed concept, a method of creating a security device comprises: providing a substrate having a surface relief diffractive structure in a surface thereof; applying a primer layer to the diffractive structure, the primer layer including a material that causes spontaneous alignment of liquid crystal; applying a liquid crystal layer to the primer layer, the liquid crystal layer being configured to align to have one of a smectic phase, a nematic phase, and a cholesteric phase; allowing time for molecules of the liquid crystal layer to align to have one of the smectic phase, the nematic phase, or the cholesteric phase and to volumetrically align through at least a portion of the thickness of the liquid crystal layer to conform to the diffractive structure; and cross-linking the liquid crystal layer.

DESCRIPTION OF THE PREFERRED EMBODIMENTS

Figure 1:
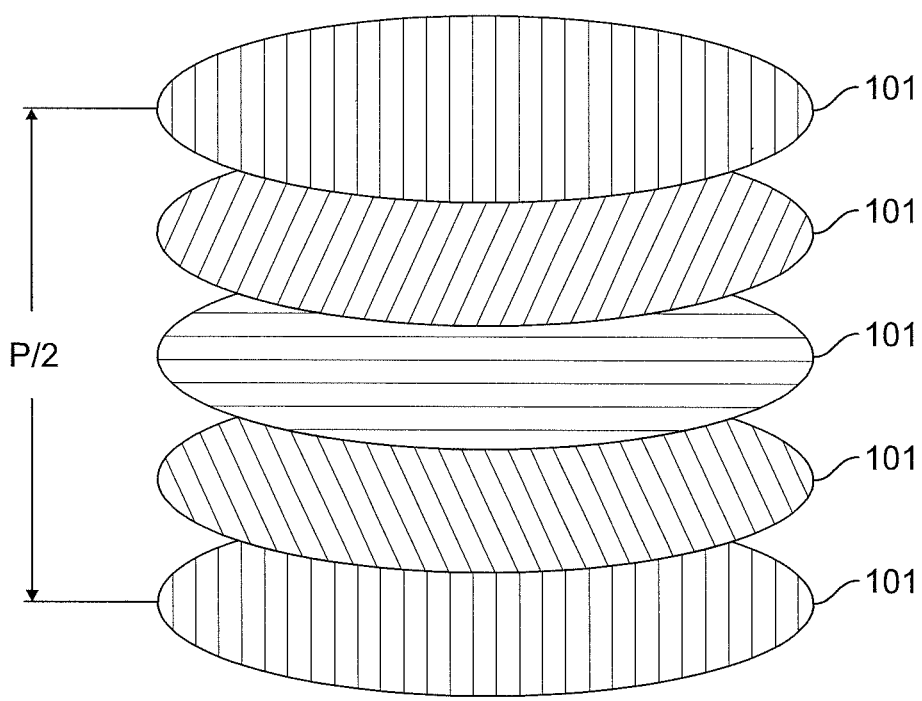
FIG. 1 is a stylized illustration of the natural molecular alignment of a liquid crystal having a cholesteric phase.

As employed herein, the term "optically variable device" (OVD) refers to a visual device that creates a change or shift in appearance, such as, for example and without limitation, a change in color or shape, when observed from different relative observation points. The term is used herein in its conventional broad sense and includes devices comprising a single optical element alone or multiple optical elements arranged so that they may or may not be touching each other, overlapping, or physically in close proximity to each other. Such elements may include, for example and without limitation, holograms, diffractive gratings, liquid crystal constructs, color-shifting inks or pigments, or micro-lens integral or autostereoscopic imaging devices.

As employed herein, the term "security device" refers to any known or suitable device which employs one or more OVDs in order to verify the authenticity of the article on which the security device is disposed, and to deter and resist copying or counterfeiting of the article.

As employed herein, the term "article" refers to an item or product on which the exemplary OVD is employed, and expressly includes, without limitation, articles used in high-security, banking, identification, and brand protection markets, such as, for example, identification cards, credit cards, debit cards, smart cards, organization membership cards, security system cards, security entry permits, banknotes, checks, fiscal tax stamps, passport laminates, legal documents, packaging labels and other information-providing articles wherein it may be desirable to validate the authenticity of the article and/or to resist alteration, tampering or reproduction thereof.

As employed herein, the term "a liquid crystal layer having molecules therein aligned volumetrically in a predetermined manner", and similar terms, mean that the naturally occurring alignment of molecules within at least a portion of the liquid crystal layer has been deliberately altered within the thickness of the layer in the predetermined manner. A liquid crystal layer in which a surface relief pattern formed in the surface of the liquid crystal or another modification to the surface of the liquid crystal layer has propagated beyond the surface of the liquid crystal layer and through at least a portion of the thickness of the liquid crystal layer is considered to have molecules therein aligned volumetrically in a predetermined manner. However, a liquid crystal layer in which a surface relief formed in the surface of the liquid crystal layer or another modification to the surface of the liquid crystal layer has not propagated beyond the surface of the liquid crystal layer and through at least a portion of the thickness of the liquid crystal layer is not considered to have molecules therein aligned volumetrically in a predetermined manner.

For simplicity of illustration, the example OVDs shown in the figures and described herein in accordance with the disclosed concept are shown in simplified and conceptual form. To more clearly show the features or components, elements, layers, and overall structure of the OVDs, certain features of the OVDs, such as the thickness of various structures, have been illustrated in exaggerated form, and are therefore not drawn to scale.

A liquid crystal having a cholesteric phase (also known as a cholesteric liquid crystal) is a type of liquid crystal having a helical structure. Within a sub-layer the liquid crystal molecules tend to align along a particular axis, and in each progressive sub-layer through the thickness of the liquid crystal, the particular axis is rotated.

FIG. 1 is a stylized diagram illustrating the alignment of a liquid crystal having a cholesteric phase. For purposes of conceptually illustrating the cholesteric phase of the liquid crystal, a finite number of conceptual sub-layers 101 are illustrated in FIG. 1. The liquid crystal molecules in a given sub-layer 101 have an axis of alignment that is periodically different from its neighboring sub-layers 101. The distance between two sub-layers 101 having their axes of alignment rotated 180° with respect to each other is known as half the pitch, or p/2, and the distance between two sub-layers 101 having their axes of alignment rotated 360° with respect to each other is known as the pitch, or p. The sub-layers 101 function as Lippmann-Bragg planes which reflect light of different wavelengths at different angles of view.

Figure 2A:
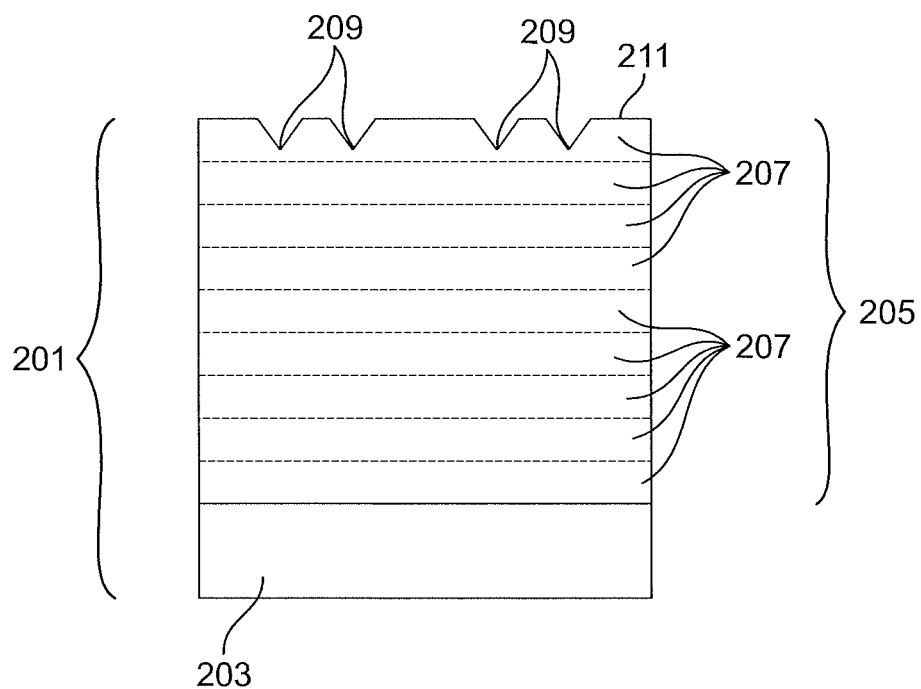
FIG. 2A is a sectional view of a typical prior art security device.

FIG. 2A shows a cross-section of a prior art security device 201 that exhibits both a color-shifting and a diffractive optical effect. A substrate 203 is coated with a liquid crystal layer 205. The liquid crystal layer 205 has a cholesteric phase. In other words, sub-layers 207 (conceptually illustrated with dashed lines) of the liquid crystal layer 205 form Lippmann-Bragg planes parallel to the substrate 203. A diffractive structure 209 is embossed, cast or molded into the surface 211 of the liquid crystal coating 205. The liquid crystal molecules at the surface 211 of the coating 205 align with the pattern of the diffractive structure 209. However, the diffractive structure 209 does not propagate through the sub-layers 207 and the sub-layers 207 that are not in the immediate vicinity of the diffractive structure 209 are unaffected by the surface treatment. Physically polishing the surface 211 so as to remove the diffractive structure 209 results in a smooth-surfaced coating of the liquid crystal layer 205 that does not exhibit a diffractive optical effect, thus showing that it is relatively easy to separate the diffractive optical effect and the color-shifting optical effect in the prior art security device 201.

Figure 2B:
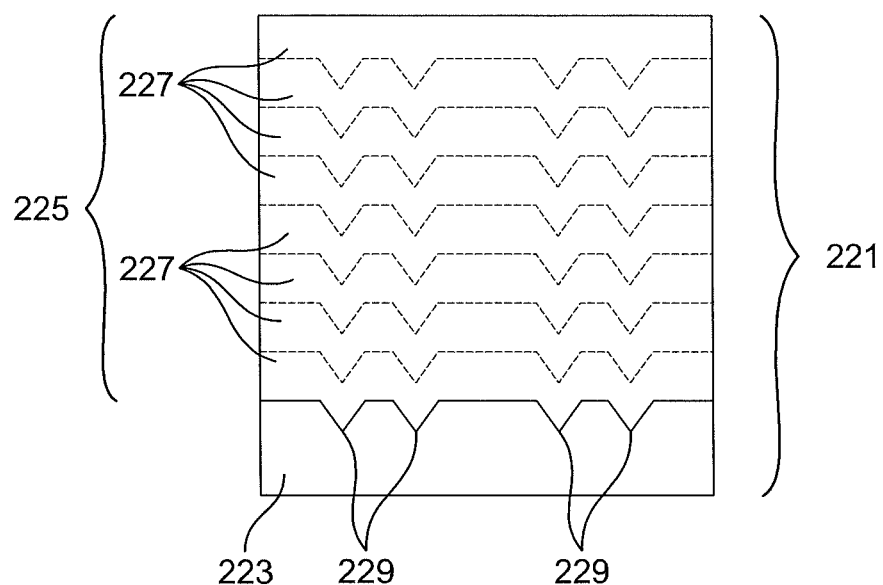
FIG. 2B is a sectional view of the volumetric molecular alignment of liquid crystal material in accordance with an embodiment of the disclosed concept.

FIG. 2B shows a cross-section of an OVD portion of a security device 221 that exhibits both a color-shifting and a diffractive optical effect in accordance with an embodiment of the disclosed concept. A liquid crystal layer 225 is disposed on a substrate 223 having a predetermined relief diffractive pattern 229 formed in the substrate 223 surface. The liquid crystal layer 225 has a cholesteric phase, and thus exhibits a color-shifting optical effect. In other words, sub-layers 227 of the liquid crystal layer 225 form Lippmann-Bragg planes parallel to the substrate 223. Molecules through at least half the thickness of the liquid crystal layer 225 are also aligned volumetrically in a predetermined manner to form a predetermined diffractive pattern or image. The molecules can also be volumetrically aligned through the whole thickness of the liquid crystal layer 225. The predetermined diffractive pattern or image corresponds with a diffractive structure 229 formed in the substrate 223, and the molecules in the liquid crystal layer 225 conform to the diffractive structure 229.

The security device 221 exhibits both a color-shifting and a diffractive optical effect. However, unlike the prior art security device 201, polishing a surface of the security device 221 will not remove the diffractive optical effect. Rather, since the molecules in the liquid crystal layer 225 are aligned volumetrically in a predetermined manner to form a predetermined diffractive pattern or image, the security device 221 will continue to exhibit the diffractive optical effect until the entire volumetrically aligned portion of the liquid crystal layer 225 is removed. In the case that the molecules of the liquid crystal layer 225 are volumetrically aligned through the whole thickness of the liquid crystal layer 225, the diffractive optical effect cannot be removed at all.

One method of causing the liquid crystal layer 225 to volumetrically align includes applying the liquid crystal layer 225 to a substrate 223 which includes material that causes spontaneous alignment of liquid crystals. Another method of causing the liquid crystal layer 225 to volumetrically align includes applying a primer (not shown) comprising material that causes spontaneous alignment of liquid crystals to the substrate 223 and then applying the liquid crystal layer 225 to the primer. On the other hand, attempting to align the liquid crystal layer 225 by mechanical means, such as by applying mechanical stress, will not result in volumetric alignment of the liquid crystal layer.

Figure 3:
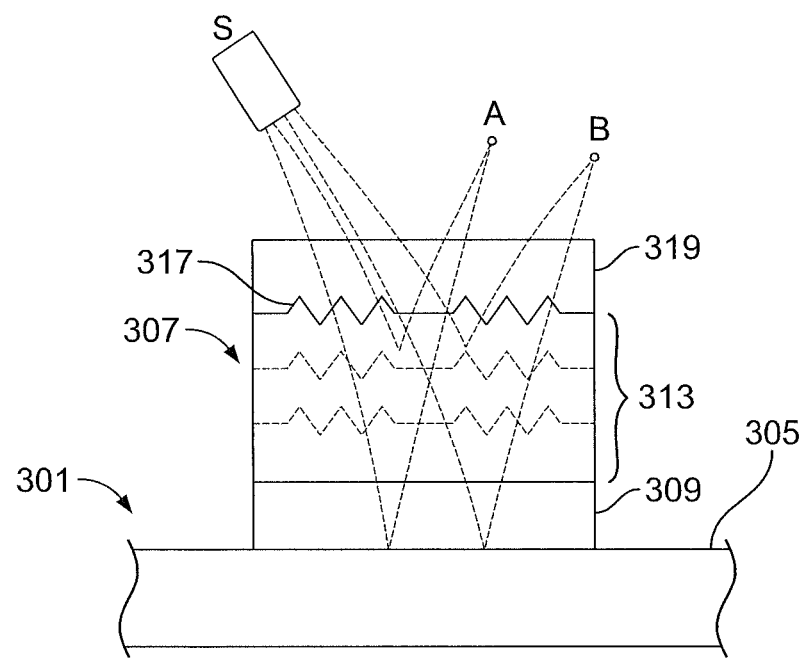
FIG. 3 is a sectional view of an example security device in accordance with an embodiment of the disclosed concept.

FIG. 3 illustrates an OVD portion of a security device 307 in accordance with an embodiment of the disclosed concept. The security device 307 is coupled to a surface 305 of an article 301 in order to resist counterfeiting of the article 301. The security device 307 includes a liquid crystal layer 313 having a cholesteric phase. The molecules in the liquid crystal layer 313 are also volumetrically aligned in a predetermined manner so as to exhibit a predetermined diffractive pattern or image. A substrate 319 is disposed on the liquid crystal layer 313. The security device 307 is attached to the surface 305 of the article 301 by means of an adhesive layer 309.

The cholesteric phase of the liquid crystal layer 313 causes light from light source S entering the security device 307 to exhibit a color-shifting optical effect. The volumetrically aligned molecules within the liquid crystal layer 313 cause light from light source entering the security device 307 to exhibit a diffractive optical effect. Some light from light source S also passes through the security device 307 and is reflected by the surface 305 of the article 301. An observer at viewpoint A will thus observe the predetermined diffractive image, a background color, and the surface 305 of the article 301. When observed from viewpoint B the observer will see the diffractive image in a different color (or colors), a background of a different color, and the surface 305 of the article 301.

The range of the color shift of both the diffractive pattern or image and the liquid crystal layer, as well as the beginning and ending colors of a color shift (i.e., the colors observed at extreme angles) can be controlled and adjusted through methods well known in the art. The color or colors of the predetermined diffractive image may therefore be designed to contrast or blend together with the background color of the liquid crystal layer. By careful choice of colors, color ranges, and image design, a complex animated security image may be produced. For example, the color of the diffractive image may be chosen so that it is the same as the background color visible at a particular angle of view, thus making the diffractive image appear and disappear as the OVD portion is tilted.

The security device 307 is suitable for use in authenticating many types of articles. When the adhesive layer 309 is transparent, the security device 307 is particularly suitable for use in authenticating articles such as, for example and without limitation, signatures or photographs, because the signature or photograph is visible through the security device.

Figure 4A:
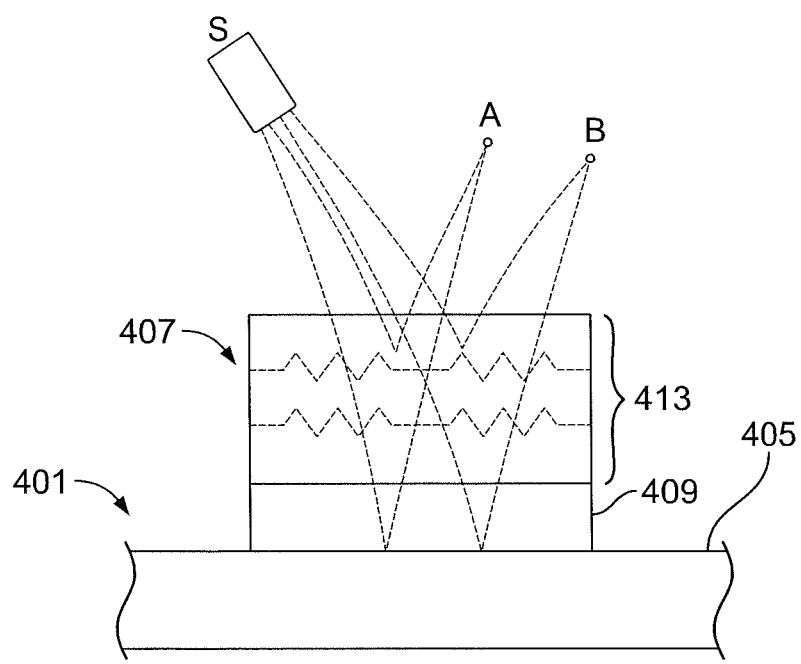
FIG. 4A is a sectional view of an example security device in accordance with another embodiment of the disclosed concept.
Figure 4B:
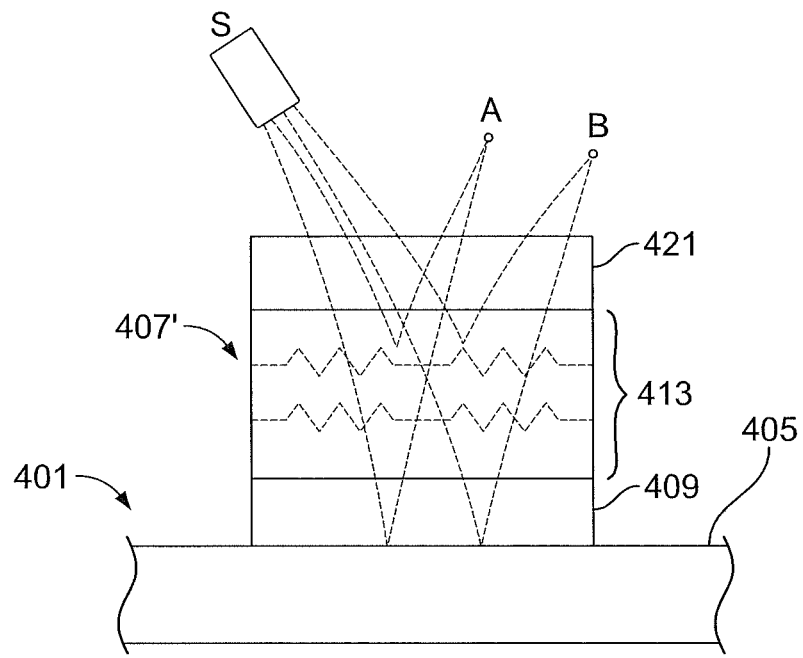
FIG. 4B is a sectional view of an example security device in accordance with another embodiment of the disclosed concept.

FIGS. 4A and 4B illustrate an OVD portion of a security device 407 in accordance with other embodiments of the disclosed concept. Referring to FIG. 4A, the security device 407 is coupled to a surface 405 of an article 401 to resist counterfeiting of the article 401. The security device 407 includes a liquid crystal layer 413 having a cholesteric phase. The molecules in the liquid crystal layer 413 are also volumetrically aligned in a predetermined manner so as to exhibit a predetermined diffractive pattern or image.

The molecules in the liquid crystal layer 413 can be volumetrically aligned by forming the liquid crystal layer 413 on a first substrate having a surface relief formed on its surface (e.g., without limitation, substrate 319 from FIG. 3). The first substrate is then removed and the surface of the liquid crystal layer 413 is polished so as to be smooth. The security device 407 is attached to the surface 405 of the article 401 by means of an adhesive layer 409.

Referring to FIG. 4B, security device 407' is similar to the security device 407 shown in FIG. 4A. However, in security device 407', a second substrate 421 is disposed on the liquid crystal layer 413 after the surface of the liquid crystal layer 413 has been polished to be smooth. It is contemplated that a protective layer may be employed in place of, or in addition to the second substrate 421 without departing from the scope of the disclosed concept. The security device 407' is attached to the surface 405 of the article 401 by means of an adhesive layer 409.

In security devices 407 and 407', the cholesteric phase of the liquid crystal layer 413 causes light from light source S entering the security devices 407 and 407' to exhibit a color-shifting optical effect. The volumetrically aligned molecules within the liquid crystal layer 413 cause light from light source entering the security device 407 to exhibit a diffractive optical effect. Some light from light source S also passes through the security devices 407 and 407', and is reflected by the surface 405 of the article 401. An observer at viewpoint A will thus observe the predetermined diffractive image, a background color, and the surface 405 of the article 401. When observed from viewpoint B the observer will see the diffractive image in a different color (or colors), a background of a different color, and the surface 405 of the article 401. Thus, security devices 407 and 407' can be employed in a similar manner as security device 307 for use in authenticating article 401.

Figure 4C:
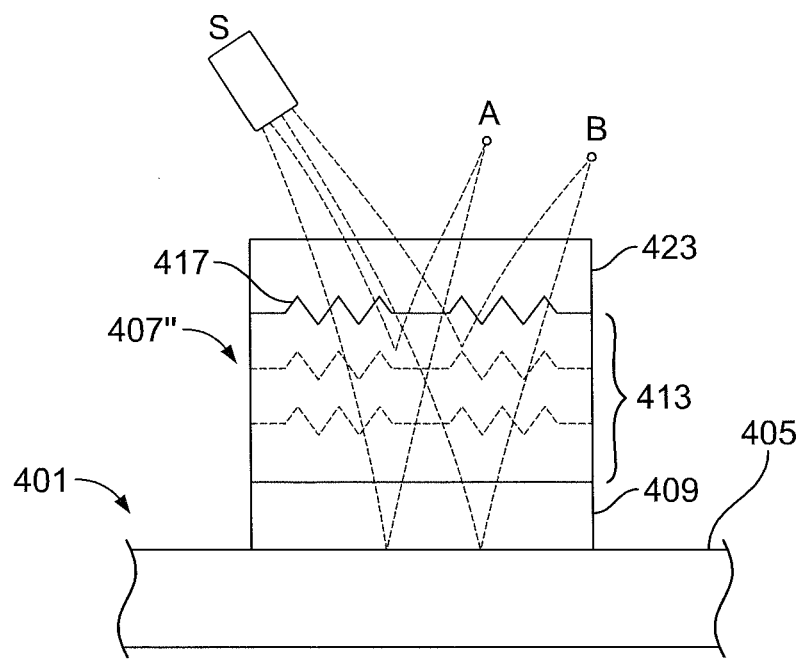
FIG. 4C is a sectional view of an example security device in accordance with another embodiment of the disclosed concept.

FIG. 4C illustrates an OVD portion of a security device 407" in accordance with another embodiment of the disclosed concept. Referring to FIG. 4C, the security device 407" is coupled to a surface 405 of an article 401 to resist counterfeiting of the article 401. The security device 407 includes a liquid crystal layer 413 having a cholesteric phase. The molecules in the liquid crystal layer 413 are also volumetrically aligned in a predetermined manner so as to exhibit a predetermined diffractive pattern or image.

The molecules in the liquid crystal layer 413 can be volumetrically aligned by forming the liquid crystal layer 413 on a first substrate having a surface relief 417 formed on its surface (e.g., without limitation, substrate 319 from FIG. 3). The first substrate is then removed and an indexing layer 423 is applied to the surface of the liquid crystal layer 413. The indexing layer 423 has a refractive index similar enough to the refractive index of the liquid crystal layer 413 such that the surface relief 417 is indexed out (i.e., the surface relief 417 does not cause the diffractive optical effect). The indexing layer 423 can then be cross-linked or otherwise solidified so as to form a solid layer.

Referring again to FIG. 3, substrate 319 is disposed directly on the liquid crystal layer 313. In the case that the substrate 319 is disposed directly on the liquid crystal layer 313, the substrate 319 should include material that causes spontaneous alignment of liquid crystals. However, as an alternative, a primer layer which causes spontaneous alignment of liquid crystals, may be disposed between the liquid crystal layer and the substrate. An example security device employing a primer layer will be described hereinafter with respect to FIG. 5.

Figure 5:
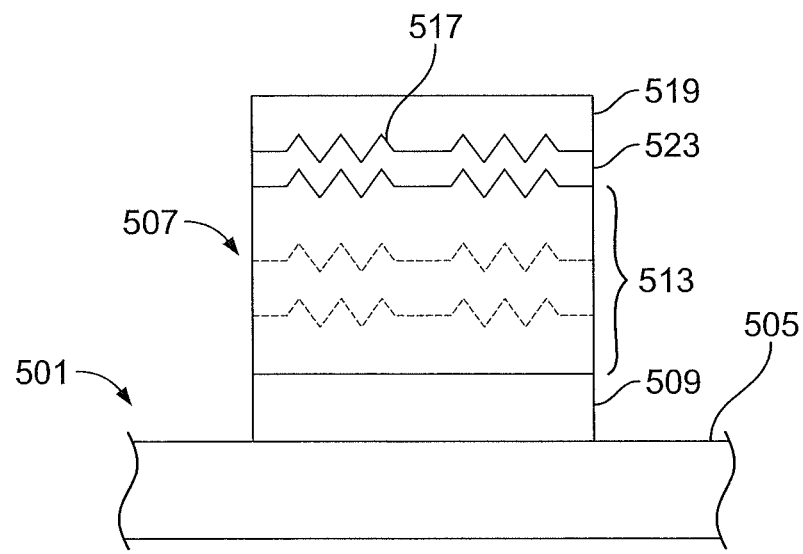
FIG. 5 is a sectional view of an example security device in accordance with another embodiment of the disclosed concept.

FIG. 5 illustrates an OVD portion of a security device 507 which employs a primer layer 523 in accordance with another embodiment of the disclosed concept. The security device 507 is coupled to a surface 505 of an article 501 in order to resist counterfeiting of the article 501. The security device 507 includes a liquid crystal layer 513 having a cholesteric phase. The molecules in the liquid crystal layer 513 are also volumetrically aligned in a predetermined manner so as to exhibit a predetermined diffractive pattern or image. A primer layer 523 is disposed directly on the liquid crystal layer 513 and includes material that causes spontaneous alignment of liquid crystals. A substrate 519 is disposed on the primer layer 523 and the diffractive pattern or image is also formed as a surface relief 517 in the substrate 519. The security device 507 is attached to the surface 505 of the article 501 by means of an adhesive layer 509.

The security device 507 can be employed in a similar manner as security device 307 for use in authenticating article 501. As with embodiments that do not include the primer layer 523, the substrate 519 and primer layer 523 may be removed or replaced (e.g., without limitation, replaced with an indexing layer or second substrate). Likewise, the surface of the liquid crystal layer 513 may be polished so as to be smooth.

Figure 6:
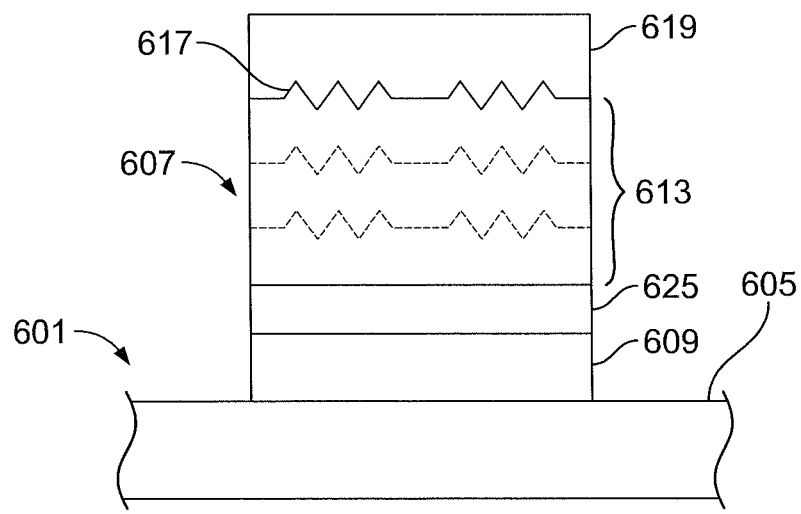
FIG. 6 is a sectional view of an example security device in accordance with another embodiment of the disclosed concept.

FIG. 6 illustrates an OVD portion of a security device 607 in accordance with another embodiment of the disclosed concept. The security device 607 is coupled to a surface 605 of an article 601 in order to resist counterfeiting of the article 601. The security device 607 includes a liquid crystal layer 613 having a cholesteric phase. The molecules in the liquid crystal layer 613 are also volumetrically aligned in a predetermined manner so as to exhibit a predetermined diffractive pattern or image. A substrate 619 is disposed on the liquid crystal layer 613 and the diffractive pattern or image is also formed as a surface relief 617 in the substrate 619. The security device 607 is attached to the surface 605 of the article 601 by means of an adhesive layer 609.

The security device 607 further includes an opaque layer 625 disposed between the liquid crystal layer 613 and the article 601. The opaque layer 625 may be, for example and without limitation, ink or some other light-absorbing material. It may also be comprised of a reflective material, for example a reflective metal such as aluminum, copper or gold.

The security device 607 can be employed in a similar manner as security device 307 for use in authenticating article 601. However, the surface 605 of the article to be authenticated 603 will not be visible from any observation point because the view will be blocked by the opaque layer 625. Thus, the addition of the opaque layer 625 may be particularly suitable in applications when it is not desired to view the article 601 through the security device 607.

As with other embodiments, the substrate 619 may be removed or replaced (e.g., without limitation, replaced with an indexing layer or second substrate). Likewise, the surface of the liquid crystal layer 613 may be polished so as to be smooth without departing from the scope of the disclosed concept.

It will be appreciated that security devices may include additional complete or discontinuous layers without departing from the scope of the disclosed concept. It will also be appreciated that security device which include addition complete or discontinuous layers of other materials to provide additional optical effects may be employed without departing from the scope of the disclosed concept. Complex imagery and optical effects may be produced by combining multiple areas of layer construction on a security device. Two examples of security devices having multiple areas of layer construction are illustrated in FIGS. 7 and 8, and will be described in more detail hereinafter.

Figure 7:
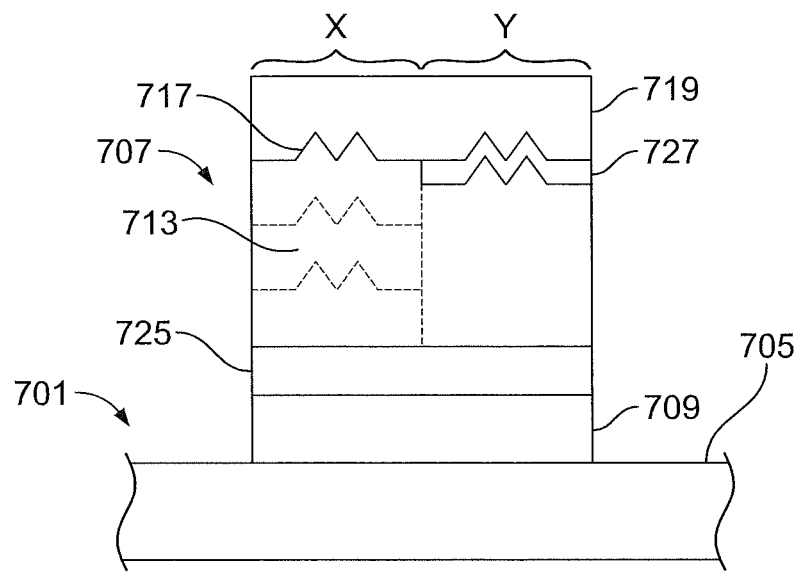
FIG. 7 is a sectional view of an example security device in accordance with another embodiment of the disclosed concept.
Figure 8:
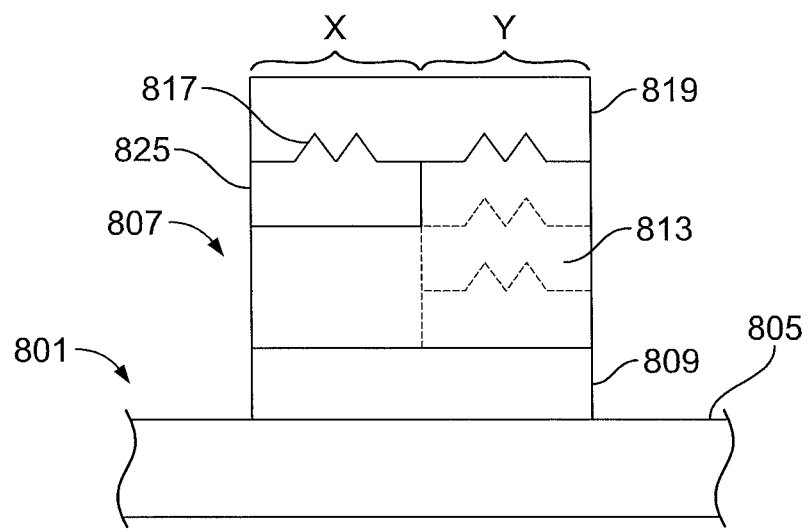
FIG. 8 is a sectional view of an example security device in accordance with an embodiment of the disclosed concept.

Referring to FIG. 7, a security device 707 is coupled to a surface 705 of an article 701 in order to resist counterfeiting of the article 701. The security device 707 includes a first area X and a second area Y. In the first area X, the security device includes a liquid crystal layer 713 having a cholesteric phase. The molecules in the liquid crystal layer 713 are also volumetrically aligned in a predetermined manner so as to exhibit a predetermined diffractive pattern or image. A substrate 719 is disposed on the liquid crystal layer 713 and the diffractive pattern or image is also formed as a surface relief 717 in the substrate 719. The first area X also includes an opaque layer 725 disposed on the liquid crystal layer 713 and an adhesive layer 709 configured to attach the security device to the surface 705 of the article 701.

The second area Y has a different layer construction than the first area X. In the second area Y, a reflective layer 727 is disposed between the substrate 719 and the adhesive layer 709. In the second area, the liquid crystal layer 713 is neither volumetrically aligned, nor is it aligned to have a cholesteric phase.

Based on their different layer constructions, the first area X will exhibit a color-shifting optical effect and a diffractive optical effect, while the second area Y will only exhibit a diffractive optical effect due to the reflective layer 727.

Referring to FIG. 8, another example of a security device 807 having multiple areas of different layer constructions is shown. The security device 807 is coupled to a surface 805 of an article 801 in order to resist counterfeiting of the article 801. The security device includes a first area X and a second area Y. In the first area X, the security device 807 includes a substrate 819 having a surface relief 817 formed thereon, a blocking layer 825, a liquid crystal layer 813, and an adhesive layer 809. The blocking layer 825 includes material which does not cause spontaneous alignment of liquid crystals (e.g., without limitation, an isotropic resin or ink). The blocking layer 825 prevents the liquid crystal layer 813 from volumetrically aligning or aligning to have a cholesteric phase in the first area X.

In the second area Y, the security device 807 includes the substrate 819, the liquid crystal layer 813 and the adhesive layer 809. Since the blocking layer 825 is not included in the second area Y, the liquid crystal layer 813 is able to align to have a cholesteric phase as well as volumetrically align in a predetermined manner so as to exhibit a predetermined diffractive pattern or image.

The second area Y of the security device 807 will exhibit both color-shifting and diffractive optical effects. The first area X will not exhibit a color-shifting optical effect. If the blocking layer 825 comprises a material capable of reflecting visible light, the first area X will exhibit a diffractive optical effect; but if the blocking layer 825 instead absorbs visible light, the first area X will not exhibit a diffractive optical effect.

If the blocking material 825 in the first area X comprises a thin layer of reflective metal, the diffractive optical effect will be able to be seen quite clearly in the first area X, as this construction is similar to that of a typical embossed hologram. If the blocking material 825 in the first area X comprises a transparent material having a refractive index that is the same as the refractive index of the substrate, then the first area will not exhibit either a color-shifting optical effect or a diffractive optical effect, but the surface 805 of the article 801 will be visible in the first area X.

In embodiments where alignment is accomplished by the use of an alignment primer, in addition to the use of a patterned blocking layer, a primer coating in the desired pattern may be used to create a patterned alignment in the liquid crystal layer.

It will be appreciated by those skilled in the art that various modifications of, alternatives, and combinations of the security devices described herein can be developed in light of the overall teachings of the disclosure. A full range of optical effects may be produced with the selective addition or subtraction of complete or partial layers of blocking, opaque, reflective, liquid crystal, diffractive, color-shifting, different refractive index, and/or materials having different optical properties, allowing the formation of complex patterns and imagery that provide enhanced security and protection from copying, alteration and reverse-engineering.

Figure 9:
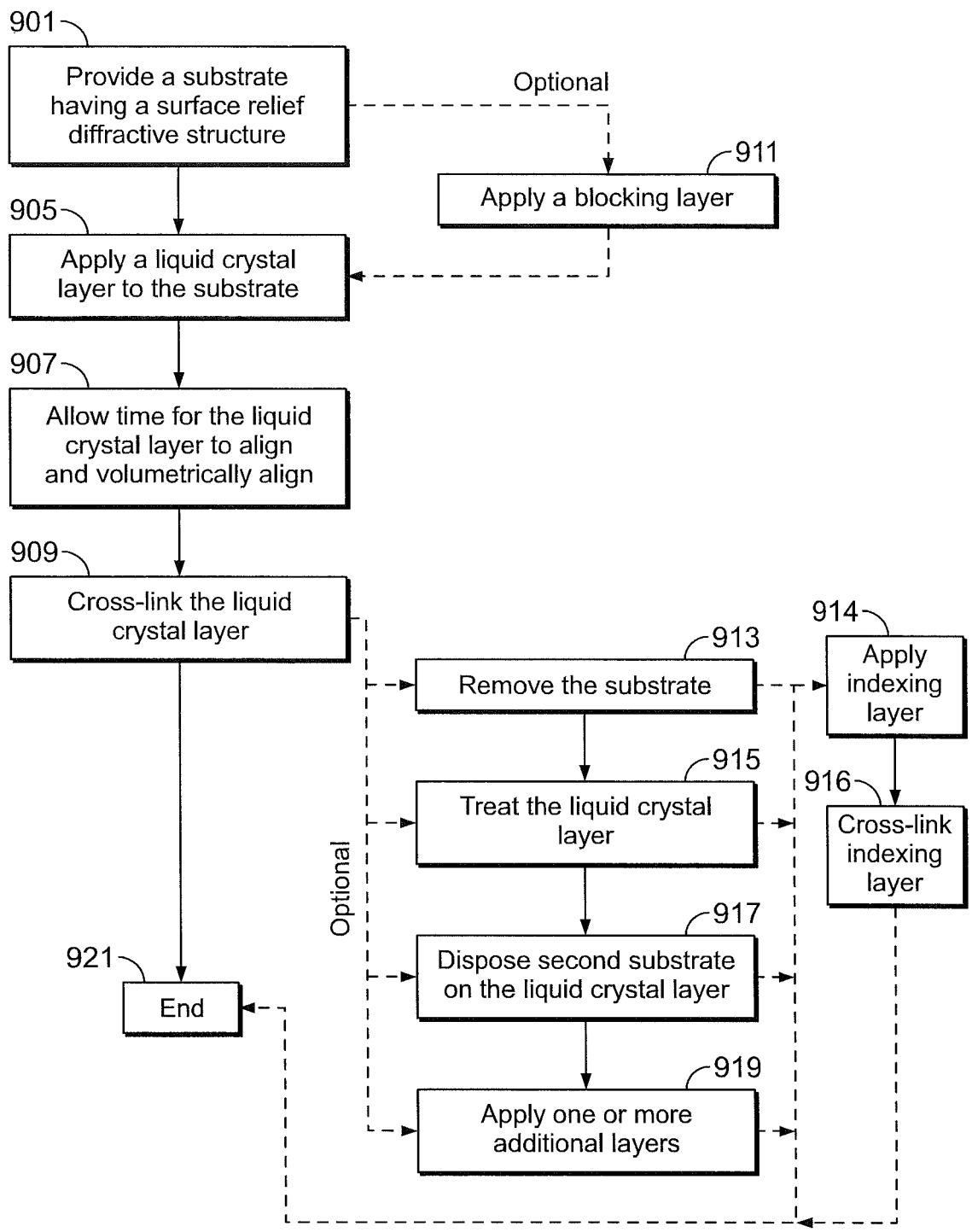
FIG. 9 is a flow diagram illustrating a method of creating a security device in accordance with an embodiment of the disclosed concept.

FIG. 9 is a flow diagram illustrating the steps of a creating a security device according to an embodiment of the disclosed concept. First, a substrate is provided in operation 901. The substrate includes a surface relief diffractive structure formed therein. The surface relief diffractive structure can be formed in the substrate using any suitable method known in the art. For example and without limitation, the surface relief diffractive structure may be formed by coating a substrate with a photo-sensitive resin; optically recording a diffraction pattern or image into the resin; and processing the exposed photo-sensitive resin by chemical etching to form a surface relief pattern. The diffraction pattern or image may be recorded using an analog process such as a mask, or a digital process such as one using a scanning electron beam or laser device, for example. Other methods for creating a surface relief diffractive structure in a substrate include, for example and without limitation, direct embossing, molding, or direct chemical or laser etching.

Once formed, a surface relief may then be mass replicated by means known in the art. For example and without limitation, a relief surface may be mass replicated by first replicating the surface in nickel metal by means of electroforming. The nickel surface may then be used as a durable tool to replicate the diffractive relief surface in other substrates by means such as, for example and without limitation, embossing via heat and pressure, molding, casting, casting and crosslink curing, and other means.

Additionally, the substrate includes material that causes spontaneous alignment of liquid crystals. For example and without limitation, the substrate may comprise a web of polyethylene, polyimide, OPP, PET film, or any other suitable material. In general, whether liquid crystal material will spontaneously align on a substrate depends on the molecular shape of the substrate and whether it will "lock in" with the molecular shape of the liquid crystal material.

In operation 905, a liquid crystal layer is applied to the substrate. The liquid crystal layer may be applied by any suitable means including, for example and without limitation, by flexographic methods, gravure methods, or bar, rod, knife or other coating methods.

The liquid crystal layer preferably includes liquid crystal which is configured to align to have a cholesteric phase. Any of several commercially available or proprietary liquid crystal materials may be used. Although a preferred material is a cholesteric liquid crystal, the disclosed concept is not thereby limited by this preference and simultaneous volumetric optical and diffractive optical effects such as phase shifts and/or polarizing effects can be produced with liquid crystal material having other phases such as the nematic and smectic phases. The liquid crystal layer may include any suitable material. Some examples of suitable materials are, without limitation, the liquid crystal mesogen Licicrypt™ SP-RMS-200 or Licicrypt™ SP-RMS201 or mixtures thereof, manufactured by Merck Chemicals and described in EP1669431A1. Other examples of suitable materials are the Lumogen® S250/S750 series of materials, manufactured by BASF. Optional operation 911 may be performed prior to performing operation 905. In operation 911, a blocking layer is applied to at least a portion of the substrate such that the blocking material is disposed between the portion of the substrate and any liquid crystal layer applied thereto. The blocking layer includes material which does not cause liquid crystals to spontaneously align (e.g., without limitation, isotropic resins or inks, metals such as aluminum, copper or gold, or any other coatable material that will not cause the liquid crystal material to spontaneously align).

The blocking layer may be applied to the substrate using any suitable method. For example, resins and inks may be applied using any of many coating or printing methods in the art. Thin patterned layers of metal may be applied using any of many vacuum coating or wet chemistry methods known in the art.

The liquid crystal layer will not align or volumetrically align on the portions of the substrate where the blocking layer is disposed between the liquid crystal layer and the substrate. Therefore these portions of the security device will not exhibit color-shifting or volume diffractive optical effects. Embodiments of the disclosed concept which employ operation 911 are useful for forming complex patterns and imagery that enable enhanced security and protection from copying, alteration and reverse engineering.

In operation 907, time is allowed for the liquid crystal layer to align to form the cholesteric phase and to volumetrically align through at least a portion of the thickness of the liquid crystal layer to conform to the diffractive structure. In one example, enough time is allowed for the liquid crystal layer to volumetrically align through half the thickness of the liquid crystal layer, and in another example, enough time is allowed for the liquid crystal layer to volumetrically align through the whole thickness of the liquid crystal layer. The time necessary for operation 907 depends on the specific liquid crystal material used in the liquid crystal layer and can be determined experimentally or computationally.

In operation 909, the aligned liquid crystal layer is cross-linked to fix its molecular structure. The cross-linking is accomplished by any of various means known in the art, depending on the chemical composition of liquid crystal layer or additions thereto. The cross-linking of the liquid crystal layer may be performed, for example and without limitation, by such means as ultraviolet radiation, infrared radiation, heat or chemical initiation. Cross-linking transforms the liquid crystal layer into a solid phase.

Once the liquid crystal layer is cross-linked, the predetermined diffractive pattern or image originally formed into the surface of the substrate is preserved within the volume of the liquid crystal layer. The liquid crystal layer will exhibit both color-shifting and diffractive optical effects even if the substrate is separated from the liquid crystal layer.

The method may then end at operation 921. However, additional optional operations may also performed, some of which will be described in more detail hereinafter.

In operation 913, the substrate may be removed from the liquid crystal layer. Methods for removal of the substrate include, for example and without limitation, physically stripping the substrate from the liquid crystal layer, or chemically dissolving the substrate from the liquid crystal layer. Other suitable means may also be employed.

If exposed by removal of the substrate, the surface of the liquid crystal layer may be treated in operation 915 to alter the optical properties of the liquid crystal layer, or to alter the surface relief structure. For example, the surface of the liquid crystal layer may be polished to make it smooth and remove the surface relief structure.

For example and without limitation, the color of playback of the liquid crystal background effect can be altered by the application of certain materials which affect the cholesteric phase of the liquid crystal layer. The application of a suitable solvent such as methyl ethyl ketone will cause some of the liquid crystal monomer to leach out of the liquid crystal layer, causing the molecular structure to collapse, decreasing the pitch and therefore the reflected wavelengths; whereas the injection of monomer into the liquid crystal layer will cause the molecular structure to swell, increasing the pitch and therefore the reflected wavelengths. Solvent may be applied, or liquid crystal monomer injected, on either side of the liquid crystal layer.

An additional example of treatment of the liquid crystal surface is to remove the relief entirely. Useful methods for removing the surface relief include, for example and without limitation, physically polishing the surface of the liquid crystal layer; chemically dissolving the surface sub-layer(s) of the liquid crystal so that the surface becomes smooth; or coating the surface with a transparent layer of material, such as liquid resin having the same refractive index, which will index out the surface relief structure, and subsequently crosslinking the resin to form a smooth outer surface. Removal of the surface relief makes unauthorized copying of the security device impossible.

In operation 917, a new substrate may be laminated to the surface of the liquid crystal layer. This may be in place of, or in addition to the original substrate. A new substrate may be desired to impart additional optical properties or to act as a protective layer.

Additionally or alternatively, further layers may be added to the security device. For example in operation 919 additional layers of material are added. Such layers may be added to either side of the security device and may be intended to impart additional optical properties or to function as protective layers, for example.

In operation 914, an indexing layer is applied to the surface of the liquid crystal layer. The indexing layer has a refractive index similar enough to the liquid crystal layer to cancel the diffractive optical effect caused by the surface relief formed in the liquid crystal layer. However, the volumetric diffractive optical effect will be preserved. In operation 916, the indexing layer is cross-linked or otherwise solidified.

For example and without limitation, light-absorbing and/or reflecting layers may be added, either as continuous or discontinuous patterned layers. Absorbing layers may comprise, for example, an ink or dye. Reflective layers may comprise, for example, a reflective metal such as aluminum, copper or gold.

Other additional layers may include, for example, layers of adhesive, color-shifting materials (color-shifting ink, for example), layers of materials of different refractive index or optical density, polarizing layers, or protective layers, and may be continuous or patterned. Complex imagery and optical effects may be produced by combining the volumetric diffractive optical effect of the invention with such treatments and additional materials.

For simplicity, FIG. 9 does not show all the possible combinations of the optional operations 911, 913, 914, 915, 916, 917 and 919. However, it will be appreciated by one of ordinary skill in the art any one or any combination of these operations may be performed in conjunction with the other operations shown in FIG. 9 without departing from the scope of the disclosed concept.

The method of FIG. 9 and variations thereof may be employed to create any of security devices 307, 407, 407', 407", 607, 707, and 807.

Figure 10:
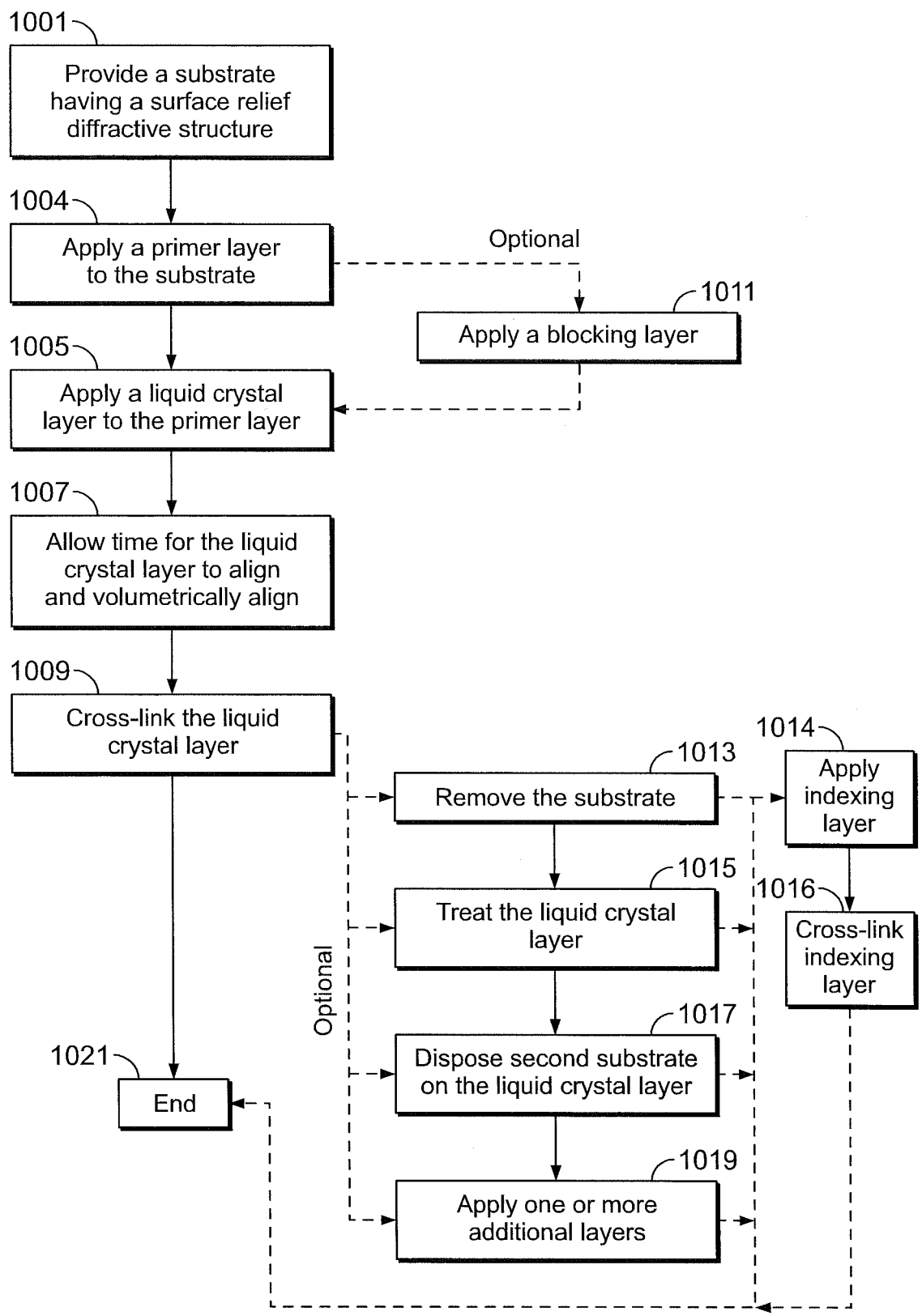
FIG. 10 is a flow diagram illustrating a method of creating a security device in accordance with another embodiment of the disclosed concept.

FIG. 10 is a flow diagram illustrating a method of making a security device according to another embodiment of the disclosed concept. The method illustrated in FIG. 10 is similar to the method illustrated in FIG. 9, except that a primer layer is applied to the substrate, and thus, the substrate does not need to include a material that causes spontaneous alignment of liquid crystals. The method of FIG. 10 is described in more detail hereinafter.

First, a substrate is provided in operation 1001. The substrate includes a surface relief diffractive structure formed therein. The surface relief diffractive structure can be formed in the substrate using any suitable method known in the art.

The substrate may be formed of any material in which it is possible to create a surface relief diffractive since. The substrate does not need to include material which causes spontaneous alignment of liquid crystals. The substrate may be made of, for example and without limitation, metal, glass, or a plastic film.

In operation 1004, a primer layer is applied to the substrate. The primer layer includes material that will cause liquid crystals to spontaneously align. In general, the molecular shape of such materials are able to "lock into" the molecular shape of the liquid crystals. Generally, the primer layer should be given time to dry after it is applied. A typical and suitable material for the primer layer is a modified polyvinyl alcohol as described in U.S. Patent Application Publication No. 2011/0097557A1. This primer material dries in 100 to 500 seconds. It will be appreciated that the primer layer may be applied to the substrate using any suitable means (e.g., without limitation, coating).

In operation 1005, a liquid crystal layer is applied directly to the primer layer. The liquid crystal layer includes liquid crystal which is configured to align to have a cholesteric phase.

Optional operation 1011 may be performed prior to performing operation 1005. In operation 1011, a blocking layer is applied to at least a portion of the primer layer such that the blocking material is disposed between the portion of the primer layer and any liquid crystal layer applied thereto. The blocking layer includes material which does not cause liquid crystals to spontaneously align (e.g., without limitation, isotropic resins or inks, metals such as aluminum, copper or gold, or any other coatable material that will not cause the liquid crystal material to spontaneously align).

The liquid crystal layer will not align or volumetrically align on the portions of the primer layer where the blocking layer is disposed between the liquid crystal layer and the primer layer. Therefore these portions of the security device will not exhibit color-shifting or diffractive optical effects. Alternatively, if the primer layer is omitted or removed from portions of the security device, the security device will not exhibit color-shifting or diffractive optical effects in the areas where the primer layer is removed. Embodiments of the disclosed concept which employ operation 1011 are useful for forming complex patterns and imagery that enable enhanced security and protection from copying, alteration and reverse engineering.

In operation 1007, time is allowed for the liquid crystal layer to align to have the cholesteric phase and to volumetrically align through at least a portion of the thickness of the liquid crystal layer to conform to the diffractive structure. In one example, enough time is allowed for the liquid crystal layer to volumetrically align through half the thickness of the liquid crystal layer, and in another example, enough time is allowed for the liquid crystal layer to volumetrically align through the whole thickness of the liquid crystal layer. The time necessary for operation 1007 depends on the specific liquid crystal material used in the liquid crystal layer and can be determined experimentally or computationally.

In operation 1009, the aligned liquid crystal layer is cross-linked to fix its molecular structure.

Once the liquid crystal layer is cross-linked, the predetermined diffractive pattern or image originally formed into the surface of the substrate is preserved within the volume of the liquid crystal layer. The liquid crystal layer will exhibit both color-shifting and diffractive optical effects even if the substrate is separated from the liquid crystal layer.

The method may then end at operation 1021. However, additional optional operations 1013, 1014, 1015, 1016, 1017, and 1019 may also performed. Operations 1013, 1014, 1015, 1016, 1017, and 1019 are similar to operations 913, 914, 915, 916, 917, and 919. Therefore, further description of these operations is omitted. For simplicity, FIG. 10 does not show all the possible combinations of the optional operations 1011, 1013, 1014, 1015, 1016, 1017 and 1019. However, it will be appreciated by one of ordinary skill in the art that one or any combination of these operations may be performed in conjunction with the other operations shown in FIG. 10 without departing from the scope of the disclosed concept.

The method of FIG. 10 and variations thereof may be employed to create security device 507 or any of security devices 307, 407, 407', 407", 607, 707, and 807, if modified to include a primer layer.

One of ordinary skill in the art will appreciate that disclosed concept may be employed in any suitable form of security device. For example and without limitation, the disclosed concept may be employed in security devices having forms such as a label, a laminate, a thread, or a transfer film. Each of these forms has an appropriate application on a particular type and configuration of an article.

Figure 11A:
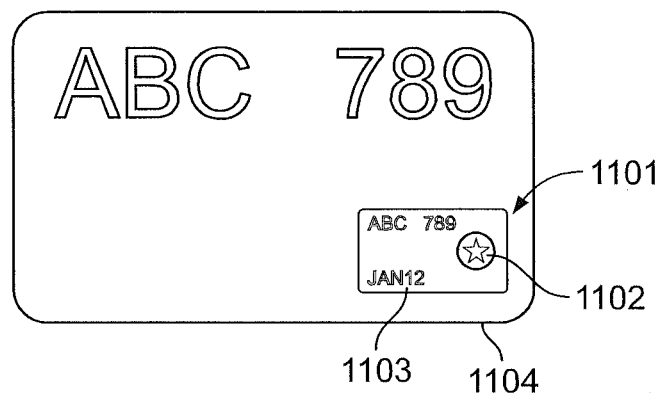
FIGS. 11A-D are simplified and exaggerated views of articles employing security devices in accordance with embodiments of the disclosed concept.

For example, a label is affixed to an article in order to function as a security device or mechanism for authenticating the article. For example, such labels are commonly employed on automobile license plates and inspection stickers to verify the registration and inspection status of the vehicle. Such a label is illustrated in FIG. 11A. A label security device 1101 includes an OVD portion 1102 which exhibits optical effects such as a color-shifting optical effect and a diffractive optical effect. One of ordinary skill in the art will appreciate that the optically variable portion 1002 of the label 1101 may be created in accordance with the concepts disclosed herein. The label 1101 may also include additional information 1103 such as characters, numbers, or symbols. The label 1101 is affixed to the license plate 1104 by means of an adhesive (not shown).

Figure 11B:
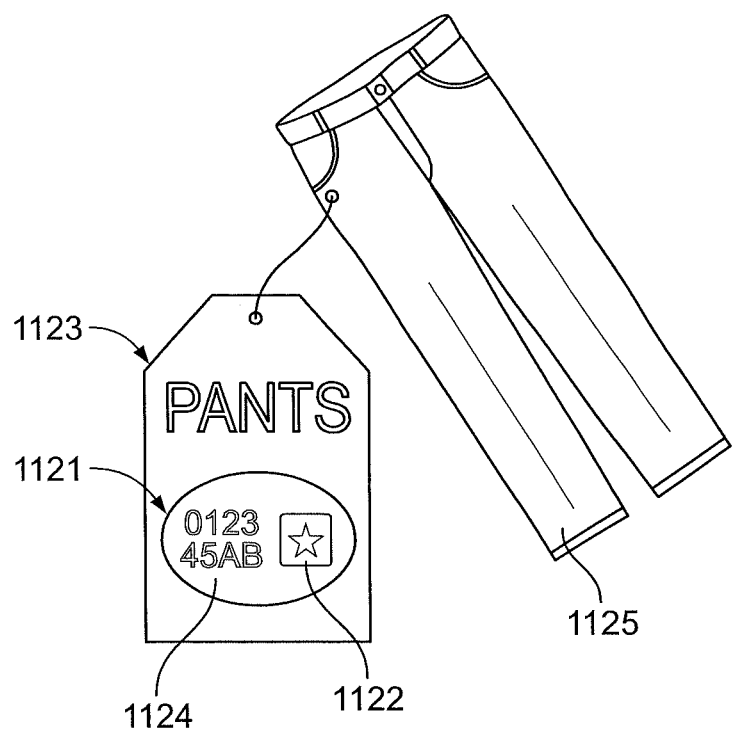

FIG. 11B illustrates a laminate form of security device on a hang tag. Laminates can be applied to a wide variety of articles, for example, as a coating or covering. For example, hang tags which are attached to goods to provide authentication of the goods, often include one or more OVDs in laminate form. A laminate security device 1121 includes an OVD portion 1122 which exhibits optical effects such as a color-shifting optical effect and a diffractive optical effect. The laminate 1121 is affixed to a hang tag 1123 by means of an adhesive (not shown). The laminate 1121 may include additional fixed or variable information 1124. The hang tag 1123 may be, for example, attached to a good 1125 as a means for authentication.

Figure 11C:
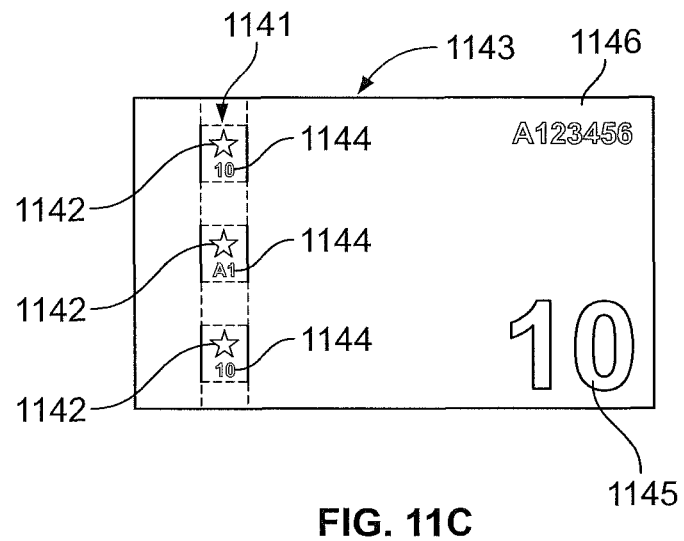

FIG. 11C illustrates the use of a security thread form of a security device in a banknote. Security thread comprises a delivery system of the OVD wherein the thread is woven or slid into the article with which it will be employed as a security device. Thin articles, such as valuable paper articles, often contain OVDs in thread form. A security thread security device 1241 comprises one or more OVD portions 1142 which exhibit optical effects such as a color shifting optical effect and a diffractive optical effect. The thread 1141 is incorporated into the paper stock of the banknote 1143 during the paper's manufacture. The thread 1141 may include additional fixed or variable information 1144, which may match information printed on the banknote 1143, such as the denomination 1145 or a serial number 1146.

Figure 11D:
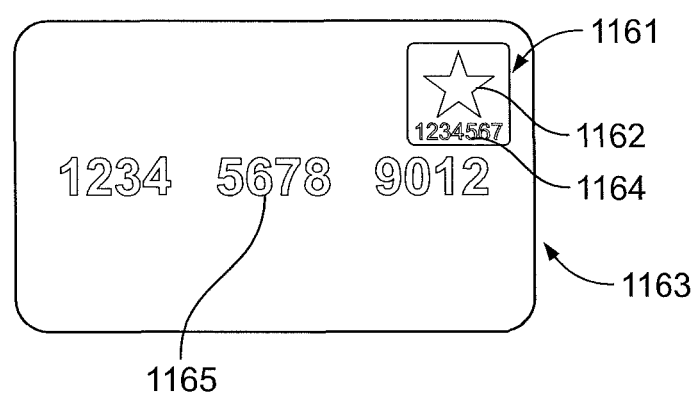

FIG. 11D illustrates the use of a transfer film form of a security device. Transfer films comprise any type of film, such as, for example, foils, wherein the OVD is applied by hot or cold stamping the foil, and subsequently transferring the foil from a substrate or carrier to the article. Transfer films comprising OVDs may be used, for example, to affix security devices to transaction and identification cards. Referring to FIG. 11D, a transfer film security device 1161 includes an OVD portion 1162 which exhibits a color-shifting optical effect and a diffractive optical effect. The transfer film 1161 may be applied to an article 1163 with the use of heat and pressure-sensitive adhesive (not shown). Once the heat and pressure are released, the substrate or carrier (not shown) is removed, leaving only the residual transfer film 1161 affixed to the article. The transfer film 1161 may comprise additional fixed or variable information 1164, which may match information appearing on the article 1165 (e.g., without limitation, an account number).

It will be appreciated that one of ordinary skill in the art will be able to incorporate the principles of the disclosed concept into any of the security devices 1101, 1121, 1141, 1161 illustrated in FIGS. 12A-D as well as any other suitable security device having an optically variable portion. Whatever form the affixed or embedded security device takes, end-users of the article may verify the authenticity of the article by examining the OVD portion and confirming that the color-shifting optical effect and diffractive optical effect are present.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A security device comprising:
    a liquid crystal layer having one of a smectic phase, a nematic phase, and a cholesteric phase and having molecules therein aligned volumetrically in a predetermined manner to form a predetermined diffractive optical pattern or image,
    wherein the molecules of the liquid crystal layer are volumetrically aligned in the predetermined manner through at least a portion of the thickness of the liquid crystal layer.

2. The security device of claim 1, wherein the liquid crystal has a cholesteric phase.

3. The security device of claim 1, further comprising:
    a substrate layer disposed on the liquid crystal layer.

4. The security device of claim 3, wherein the substrate layer is disposed directly on the liquid crystal layer and comprises a material that causes spontaneous alignment of the liquid crystal layer.

5. The security device of claim 3, further comprising:
    a primer layer disposed directly on the liquid crystal layer and between the liquid crystal layer and the substrate layer,
    wherein the primer layer comprises a material that causes spontaneous alignment of the liquid crystal layer.

6. The security device of claim 1, further comprising:
    an adhesive layer configured to attached the optically variable device to an article.

7. The security device of claim 6, further comprising:
    an opaque layer disposed between the liquid crystal layer and the adhesive layer.

8. The security device of claim 1, wherein the molecules of the liquid crystal layer are volumetrically aligned in the predetermined manner through the full thickness of the liquid crystal layer.

* * * * *